(12) United States Patent
Meunier et al.

(10) Patent No.: US 8,725,774 B2
(45) Date of Patent: May 13, 2014

(54) ENFORCING POLICIES OVER LINKED XML RESOURCES

(71) Applicant: Xerox Corporation, Norwalk, CT (US)

(72) Inventors: Jean-Luc Meunier, St. Nazaire les Eymes (FR); Jean-Pierre Chanod, Grenoble (FR); Jean-Yves Vion-Dury, St. Ismier (FR)

(73) Assignee: Xerox Corporation, Norwalk, CT (US)

( * ) Notice: Subject to any disclaimer, the term of this patent is extended or adjusted under 35 U.S.C. 154(b) by 56 days.

(21) Appl. No.: 13/645,957

(22) Filed: Oct. 5, 2012

(65) Prior Publication Data

US 2014/0101203 A1    Apr. 10, 2014

(51) Int. Cl.
*G06F 17/30* (2006.01)

(52) U.S. Cl.
USPC .......................................................... 707/794

(58) Field of Classification Search
CPC ................... G06F 17/30734; G06F 17/30908; G06F 8/10; G06F 17/30289
USPC .................................. 707/794, 756, 999.102
See application file for complete search history.

(56) References Cited

U.S. PATENT DOCUMENTS

| | | | | |
|---|---|---|---|---|
| 7,606,785 | B1 * | 10/2009 | Shirriff | 706/59 |
| 7,702,645 | B2 * | 4/2010 | Khushraj et al. | 707/999.102 |
| 7,739,218 | B2 * | 6/2010 | Arguello et al. | 706/61 |
| 7,756,992 | B1 * | 7/2010 | Zhao | 709/231 |
| 7,761,480 | B2 * | 7/2010 | Toledano et al. | 707/804 |
| 8,209,599 | B2 | 6/2012 | Vion-Dury et al. | |
| 8,392,353 | B2 * | 3/2013 | Cho et al. | 706/60 |
| 2006/0248045 | A1 * | 11/2006 | Toledano et al. | 707/2 |
| 2009/0254574 | A1 * | 10/2009 | De et al. | 707/100 |
| 2009/0320093 | A1 * | 12/2009 | Glazier et al. | 726/1 |
| 2011/0271176 | A1 * | 11/2011 | Menday | 715/234 |
| 2013/0204910 | A1 * | 8/2013 | Sawant et al. | 707/811 |
| 2013/0275448 | A1 * | 10/2013 | Mirhaji | 707/756 |

OTHER PUBLICATIONS

"W3C OWL 2 Web Ontology Language Document Overview" Oct. 27, 2009, pp. 1-11, Retrieved from http://www.w3.org/TR/owl2-overview/.

"W3C SWRL: A Semantic Web Rule Lanugage Combining OWL and RuleML", May 21, 2004, pp. 1-33, Retrieved from http://www.w3.org/Submission/SWRL/Overview.html.

(Continued)

*Primary Examiner* — Debbie Le
(74) *Attorney, Agent, or Firm* — Fay Sharpe LLP (57) ABSTRACT

A system and method generate an ontology of linked resources. The method includes providing a policy comprising at least one logical rule which is to hold across an ontology of linked resources and initializing a set of resources with an initial subset of the set of resources, each resource in the initial subset being identified by a respective link. Each of the resources in the subset is processed, which includes populating the ontology with a corresponding member of a resource class, for a resource that is valid against a schema, asserting the member's class as a class specific to the schema of the validated resource in the ontology and providing a dependency specification for extracting links within the resource, each extracted link identifying one of the set of resources. A link property is asserted in the ontology for a link between the resource of the subset containing an extracted link and the resource identified by the extracted link and the ontology populated with a member of the resource class for each newly identified resource. A verification that the at least one logical rule holds across the set of resources in the ontology is performed.

24 Claims, 8 Drawing Sheets

(56) References Cited

OTHER PUBLICATIONS

"Semantic Reasoner", Sep. 21, 2012, pp. 1-4, Retrieved from http://en.wikipedia.org/wiki/Semantic_reasoner.

"Web Ontology Language" Aug. 10, 2012, pp. 1-14, Retrieved from http://en.wikipedia.org/wiki/Web_Ontology_Language.

"XML Schema" Jun. 25, 2012, pp. 1-3, Retrieved from http://en.wikipedia.org/wiki/Xml_schema.

Bohring, et al. "Mapping XML to OWL Ontologies", 2005 Leipziger Informatik-Tage, vol. 72 of LNI, pp. 1-10.

Ferdinand, et al. "Lifting XML Schema to OWL", ICWE 2004, pp. 1-5.

Guerrero, et al. "Ontology-based integration of management behavior and information definitions using SWRL and OWL", pp. 1-12.

Lehti, et al. "XML Data Integration with OWL: Experiences & Challenges", Saint'04, IEEE Computer Society, pp. 1-8.

Rodrigues, et al. "Mapping XML to Existing OWL Ontologies", International Conference WWW/Internet, 2006, pp. 1-8.

Vion-Dury, et al. "Managing XML References through the XRM vocabulary", Proceedings of Balisage: The Markup Conference 2009, Aug. 11-14, 2009, pp. 1-16.

* cited by examiner

ENFORCING POLICIES OVER LINKED XML RESOURCES

BACKGROUND

The exemplary embodiment relates to enforcing policies over links (references) across markup language documents. It finds particular application in connection with Extensible Markup Language (XML) documents, and will be described with particular reference thereto.

XML is a widely used markup language which aids information systems in sharing structured data, encoding documents, and serializing data. An XML document may have many links (e.g., uniform resource locators (URLs)) within the document that express the relationship of the document to other resources, which may also be XML documents. Although the links inside the document are precisely defined through their syntactic and semantic structure, it is difficult and time-consuming to gather information about the context in which the links are used and how links to multiple documents interrelate.

XML schemas can enforce properties within a particular document by, for example, enforcing a certain format for links, but schemas are not designed to enforce complex (or even basic) relationships between linked documents.

Enforcing rules across a large number of resources which refer to each other can be challenging and computationally intensive. Resources may be primarily XML resources referring to other XML or non-XML resources using the URL mechanism. A convenient mechanism to ensure that certain properties hold over the whole set of inter-related XML resources is desirable.

Currently, there are tools which perform semantic reasoning across objects having properties. There are also approaches to migrate an XML dataset into an ontological domain for use by a semantic reasoner, but there is no tool to apply a semantic reasoner to resource relationships such as links between XML documents.

For example, ontology-based policy management has recently been proposed which relies on the Web Ontology Language (OWL), the ontology language proposed by the W3C (see W3C. 2009-10-27. http://www.w3.org/TR/owl2-overview/), which is a family of knowledge representation languages for authoring ontologies. The additional use of a Semantic Web Rule Language (SWRL), which is based on a combination of the OWL DL and OWL Lite sublanguages of the OWL Web Ontology Language with the Unary/Binary Datalog RuleML sublanguages of the Rule Markup Language (see http://www.w3.org/Submission/SWRL/), has been proposed, so as to express additional rules using Horn-like clauses.

The present exemplary embodiment provides a system to create a resource ontology for a set of linked resources based on the nature of the resources and the nature of the links between them. It further provides a system which can verify that a policy holds (is valid) across the set of resources and links by automated semantic reasoning.

INCORPORATION BY REFERENCE

The following reference, the disclosure of which is incorporated herein by reference in its entirety, is mentioned:

U.S. Pat. No. 8,209,599, issued Jun. 26, 2012, entitled METHOD AND SYSTEM FOR HANDLING REFERENCES IN MARKUP LANGUAGE DOCUMENTS, by Jean-Yves Vion-Dury and Jean-Pierre Chanod, discloses methods for processing links in a markup language document, particularly an XML document.

BRIEF DESCRIPTION

In accordance with one aspect of the exemplary embodiment, a method for generating an ontology of linked resources includes providing a policy comprising at least one logical rule which is to hold across an ontology of linked resources, and initializing a set of resources with an initial subset of source resources of the set of resources, each source resource in the initial subset being identified by a respective link. With a computer processor, each of the source resources in the subset is processed, including populating the ontology with a corresponding member of a resource class, and for a source resource that is valid against a schema, asserting the member's class as a class specific to the schema of the validated source resource in the ontology. For a source resource that is valid against the schema, a dependency specification is provided for extracting links within the source resource, each extracted link identifying a target resource of the set of resources. Provision is made for asserting a link property in the ontology for a link between the source resource and the target resource identified by the extracted link and for populating the ontology with a member of the resource class for each identified target resource. It is verified that the at least one logical rule holds across the set of resources in the ontology.

In another aspect, a computer-based system for building an ontology representing linked documents includes memory which stores a policy that specifies at least one property of an ontology of linked resources. An ontology engine, for an initial subset of source resources of a set of resources, each source resource being accessible by a link, adds a class member to an ontology for each source resource in the subset. A dependency generator processes the subset of source resources to extract links that are compliant with a dependency specification, the ontology engine adding a link property to the ontology for a link between the source resource containing an extracted link and a target resource in the set of resources identified by the extracted link. The ontology engine is configured for adding a class member to the ontology for the target resource. The dependency generator is configured for processing the target resource as a source resource. A semantic reasoner verifies that the ontology is consistent with the policy. A processor in communication with the memory is configured for implementing the ontology engine, dependency generator, and semantic reasoner.

In another aspect, a method for generating an ontology of linked resources includes defining a plurality of resource classes for a web ontology, the resource classes including a plurality of XML resource classes. A schema is provided for each of the plurality of XML resource classes. A dependency specification is provided for extracting links from a resource which is compliant with one of the schemas. A set of resources is initialized with an initial subset of the set of resources, each resource in the initial subset being identified by a respective link. Each resource is processed with a computer processor, including: a) adding a class member to an ontology for each resource currently in the set of resources, b) for each resource which is valid against a schema, asserting its class in the ontology as the class specific to the schema of the validated resource, c) for a resource that is valid against a schema, extracting links within the resource with the dependency schema, each extracted link identifying one of the set of resources, d) asserting a link property in the ontology for a link between the resource in the initial subset and the resource identified by an extracted link. a), b), c), and d) are repeated for each of a plurality of the identified resources added to the set of resources to generate the ontology.

DETAILED DESCRIPTION

Aspects of the present exemplary embodiment relate to a system and method for implementing policies over links across a set of resources, such as markup language documents. Each link serves as a reference to another resource in the set of resources. The reference may be a unique reference, such as a uniform resource identifier (URI).

A "resource" can be any type of information container identified by a link. A resource that is XML well-formed is an XML resource. While particular reference is made to XML documents as resources, it will be appreciated that other markup language documents and non-markup language documents are contemplated in the set of resources.

A "schema" is a set of rules governing one or more XML documents, of which the XML document is an instance of the schema. A schema can be a widely used type of schema such as XHTML or an application-specific one. Schemas are helpful to enforce structural rules within XML documents, but are not able to enforce rules covering the relationships between documents. When managing a large number of inter-linked resources, it is helpful to be able to enforce constraints across all of the resources.

A "link" or "reference" as used herein identifies a target resource by a reference to it, from a source resource, the source resource being the resource which references the target resource and the target resource being the referenced resource. The link allows the resource to be retrieved by accessing the link. In the present method, a link can be associated with one or more properties, which express the link type as well as its nature (e.g., defined by tags and/or attributes of the link). The link type property defines a link type selected from a predetermined set of two or more link types and may be associated with information to denote the source resource in addition to the target resource. Examples of link types include reference links and inclusion links. A reference link references an external resource, such as another web, page which is not located within the document itself, but is located elsewhere, such as on a remote server and which can be fetched therefrom by accessing the link. An inclusion link references an internal resource, included in the resource, such as an image. An annotated link can thus include a reference to a target document (e.g., a URL, URN, URI, IRI, XRI, and XLink (either relative or absolute)), an identifier of a source document which contains the link in its data, a link type which specifies the type of the link, and optionally a link property (e.g., as a link type sub-property), which specifies the nature of the link. Exemplary types of link include URLs, that can be found in a given XML document instance. Each link is generally in either the form of an attribute or a text node in the XML document. Once parsed, an XML document is composed of an element node, attribute nodes or text nodes.

A "policy," as used herein, refers to a set of rules which govern relationships between inter-linked documents by establishing constraints to be applied to a set of linked resources, such as XML documents, and their links. A policy may thus specify the constraints to be enforced across the documents in a set. The policy may include a set of constraints, which may be formally expressed using a suitable ontology language, such as OWL, the ontology language proposed by the W3C, to define the policy across the inter-linked resources. Optionally, SWRL may be used to express additional rules using, for example, Horn clauses. OWL and SWRL are useful due to the expressive power and formal foundation of descriptive logic, however, other Web Ontology Languages are also contemplated. The policy constraints written in OWL or another language capable of capturing the constraints can be in the form of an ontology, which will be referred to herein as a policy ontology.

The exemplary policy ontology expresses constraints based on resource classes and link properties, specifically, link types and/or link natures. Link natures may be sub-properties of the link type. A constraint may depend on which resource classes are linked, what type of link is used between the resources, the nature of the link, or a combination thereof. The policy allows a user to describe properties that should or should not hold over these links, thereby defining the link relationships between resources. For example, a policy could specify a maximum and/or minimum number of resources that are directly linked to a given resource, the type of resource (target and/or source) which may be linked, and so forth. During the method, the resources themselves are classified, and the links are typed so this information can be used when compliance with the policy is being evaluated.

In order to validate that the constraints are satisfied, they are applied to a structure (web ontology) that captures the relationships of the resources. A formal expression of the relationships of a set of resources may be expressed in OWL, allowing the policy constraints and the relationship structure to be expressed in the same format. The formal expression of the relationships of the resources will be referred to as a web ontology to distinguish it from the policy ontology, and the composite of the policy and web ontology as a "resource ontology." The web ontology may use the same resource types and link types as the policy ontology to map how the resources are related to each other. Although the web ontology contains class members corresponding to links, it also contains class members corresponding to resources, so that there is an object for the link to refer to.

The web ontology and the policy ontology may be separate or may be combined to form a resource ontology. Either separately or together, the policy ontology and the web ontology are input to a semantic reasoner (parser). When verifying the constraints, the semantic reasoner may not distinguish between the web ontology portion and the policy portion. Both are logical rules that are either consistent within themselves and with each other (valid) or inconsistent (invalid).

The creation of the policy ontology and the web ontology may be performed independently, and either may be built first. In one embodiment, the policy ontology used to express a policy across a set of linked resources may be a separate (orthogonal) ontology from whatever organization underpins the information system that contains the documents. That is, the policy ontology that is used to verify properties may be different from the application specific organization of the resources (e.g., a database schema for document retrieval). The policy ontology may express constraints regarding the storage scheme independently of the role of the resources in an application.

Figure 1:
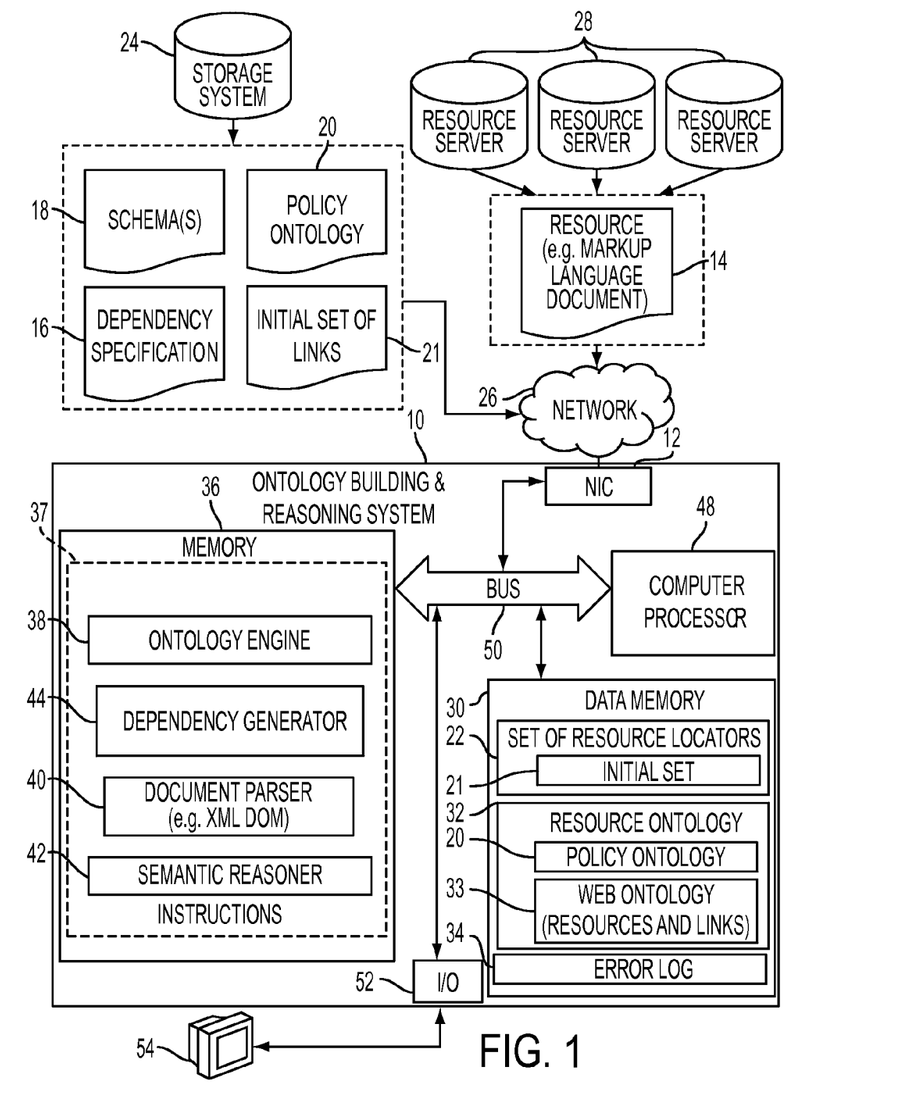
FIG. 1 is a functional block diagram of an exemplary system for performing a method of one embodiment.

FIG. 1 illustrates an exemplary computer system 10 for building a resource ontology and then analyzing the resource ontology using semantic reasoning. The system 10 includes a Network Interface Controller (NIC) 12 for receiving resources 14, dependency specifications 16, schemas 18, a policy ontology/ontologies 20, and an initial subset 21 of resources, identified by their respective links, such as resource locators, each identifying a respective target resource 14. The dependency specifications 16, schemas 18, policy ontology 20, and the initial set 21 of resource locators may be received from a storage system 24, which may use any suitable non-transitory media such as a ROM or RAM drive. The dependency specifications 16, schemas 18, policy ontology 20, and initial input set 21 may input into the system in the form of a carrier wave over a wired or wireless link, such as a network 26, e.g., via the Internet. Alternatively, the specifications 16, schemas 18, policy 20, and initial input set 21 may be generated within the computing system 10 itself and stored on a storage means (not shown). The resources 14 are retrieved from one or multiple resource servers 28. Alternative input means for receiving the data from the storage system and resource servers include a modem link, a wired or wireless connection, USB port, floppy or hard disk receiver, or the like.

The system 10 includes data memory 30 for storing a set of links such as resource locators 22 being processed, which begins with the initial input set 21, and a resource ontology 32 being built. The data memory may also store a log 34 which records errors identified during the processing, such as when a referenced resource is found not to exist. The links set 22 is initialized with the initial input set 21 and may have more data added to it during processing. In an embodiment where the web ontology 33 and policy ontology 20 are combined in the resource ontology 32, the resource ontology 32 is initialized with the policy ontology 20 and the web ontology 33 may be added during processing.

Received resources 14, dependency specifications 16, schemas 18, and policy 20, and input set 21, may be stored in data memory 30 as they are received. Main memory 36 stores instructions 37 for performing the exemplary method. The instructions 37 are illustrated as including several program modules including an ontology engine 38, a document parser 40, and a semantic reasoner 42. The document parser 40 may be an XML document object model (DOM) engine. The ontology engine 38 may access or include a dependency generator 44.

The dependency generator 44 extracts links from the resources 14, using, for example, the method described in above-mentioned U.S. Pat. No. 8,209,599, incorporated by reference. The exemplary dependency generator 44 uses link descriptions to perform one or more of the following: verify the compliance of the extracted links according to standards describing properties, check the conformance of the links to specific or general properties, rewrite some links into other links, and generate a list of all relevant links (dependencies) with related useful meta-information such as a path expression.

The dependency generator 44 may use alternative methods of link processing and extraction, such as using a regular expression engine to match the links in XML documents or using a document object model (DOM) built by an XML parser to extract links. Those approaches may, however, entail more custom coding than the dependency generator of the U.S. Pat. No. 8,209,599.

The exemplary dependency generator 44 uses a dependency specification 16 to process the links 22 in the documents. The XML schemas 18 whose documents are to be processed may each have a corresponding dependency specification and the dependency generator thus applies the dependency specification for the schema that matches the resource.

The system 10 receives an initial set 21 of resource locators, which may have been selected by a user, e.g., from the storage system 24, and saves it in data memory 30, where it becomes the initial subset of the set of resource locators 22. The ontology engine 38 retrieves each universal resource locator (URL or, more generally, link) in turn from the input subset 21 and for each link, retrieves the corresponding resource 14 from a resource server 28. The ontology engine 38 then adds a first class member to the web ontology 33 in the data memory 30 for that input resource locator. The ontology engine optionally calls the document parser 40 to parse the corresponding resource 14 and then calls the dependency generator 44. The dependency generator 44 extracts links from the resource 14 and adds them to the stored set of resource locators 22. The ontology engine 38 then adds them to the web ontology 33. The process is repeated for each of the URLs in the input set. In one embodiment, URLs from retrieved resources are added to the set 22, indicating that these links point to resources to be processed, and class members are added to the web ontology 33 to capture the structure of the links between resources. In an alternative embodiment, only links in the initial set are processed, so that the set of resource locators 22 does not grow as new resources (documents) are processed. In either embodiment, when all the links in the set 22 have been processed, the web ontology 33 of the resource ontology 32 is built. In an embodiment where the web ontology and policy ontology are not combined, then, after the web ontology is built, the ontology engine 38 may retrieve a policy ontology 20 from the storage system 24 and call the semantic reasoner 42 to validate the web ontology 33 against the policy ontology 20. In the embodiment shown in FIG. 1, the retrieved policy ontology 20 is stored in memory, and the semantic reasoner is called with the resource ontology 32 as input. The semantic reasoner 42 may then return an indicator of whether the policy was valid across the resource ontology 32 and any messages (such as error messages) that were accumulated in the log 34 during processing of the resources 14 and validating the resource ontology 32.

The computer system 10 may include an input/output (I/O) device 52 to output such messages. The exemplary output device 52 may be linked by a wired or wireless link to a display device 54, such as a screen or monitor, and/or may be connected to the storage system 24, where outputs may be stored, optionally together with corresponding initial set 21, set 22, policy ontology 20, web ontology 33, and resource ontology 32.

The ontology building and reasoning system 10 may be implemented as hardware or a combination of hardware and software on any suitable computing device or combination of devices. In the exemplary embodiment, the system comprises software instructions in the form of execution modules 38, 40, 42 stored in main memory 36 which are executed by the computer processor 48 in communication with main memory 36. The processor 48, such as the computer's CPU, may control the overall operation of the computer system by execution of processing instructions stored in memory 36. Components 12, 30, 36, 48 of the system 10 are communicatively connected by a bus 50.

In one embodiment, the XML resources 14 are each typed by a respective XML schema 18. Each XML schema can be selected from a predetermined set of two or more schemas stored in storage system 24. The XML schemas can be defined according to the needs of the application. The XML schemas 18 each have a corresponding class in the resource ontology 32 (i.e., one class per schema) and the resources 14 are each entered into the web ontology 33 as an instance of their respective schema class. The dependency generator 44 extracts the links 22 from the retrieved resource 14 and enters the links into the web ontology 33, making the links between the resources, and the nature of those links, explicit in the web ontology. The web ontology 33 contains the appropriate concepts of resources and links using classes and properties for the XML schemas in the resource set.

After the web ontology 33 has been built, the semantic reasoner 42 checks that the web ontology complies with the policy 20. Policy enforcement may be performed using any suitable semantic reasoner, such as the Pellet semantic reasoner, which is designed for OWL with several application interfaces, such as an API for Java.

As will be appreciated, system 10 may comprise one or more computing devices, such as a personal computer, PDA, laptop computer, server computer, or combination thereof. Memories 30, 36 may be integral or separate and may represent any type of computer readable medium such as random access memory (RAM), read only memory (ROM), magnetic disk or tape, optical disk, flash memory, or holographic memory. In one embodiment, the memories 30, 36 comprise a combination of random access memory and read only memory. In some embodiments, the processor 48 and memory 30 and/or 36 may be combined in a single chip.

The network interface 12 allows the computer to communicate with other devices via a computer network, such as a local area network (LAN) or wide area network (WAN), or the Internet, and may comprise a modulator/demodulator (MODEM) a router, a cable, and/or Ethernet port. The digital processor 48 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
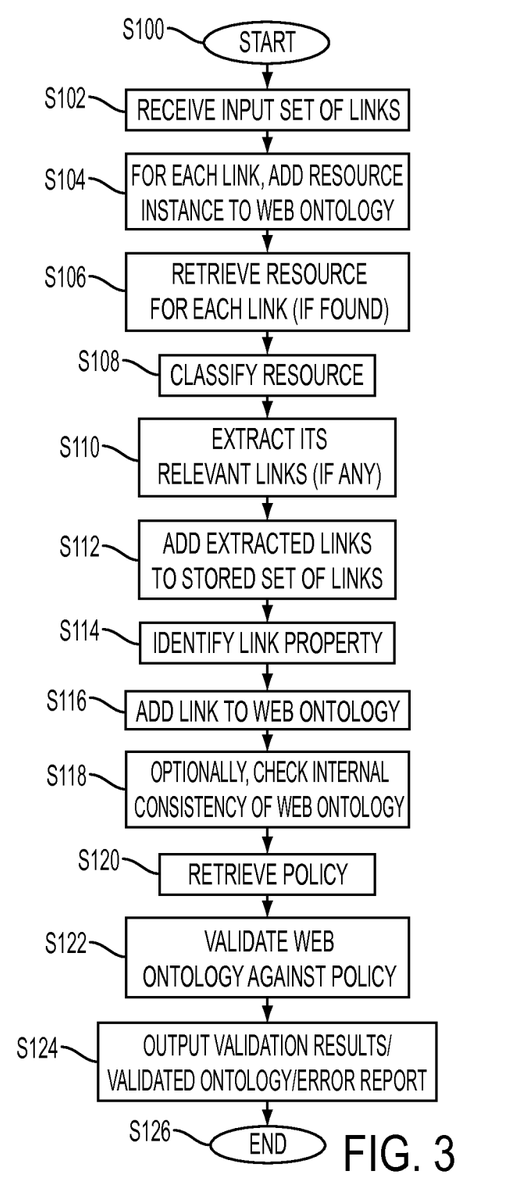
FIG. 3 is a flow chart illustrating a method for generating and validating an ontology in accordance with one embodiment.

FIG. 3 illustrates an exemplary method which may be performed with the system of FIG. 1. The method begins at S100.

Briefly, at S102, a set of links 21 is input to the system and a web ontology is instantiated. S104 to S116 may be performed for each of the links and may include adding a resource instance to the web ontology, retrieving the resource 14 for the link 21, if it exists (S106), and classifying the resource as a member of a class which is based on its type (S108). The links contained within the resource itself are extracted (S110) and at S112, may be added to the stored set of links 22.

For each of the links, at S114, properties of the link from the source resource to the target resource are identified and a link type assigned based on the properties. At S116, the annotated link, which includes a link type and the optionally normalized reference, is added to the web ontology. S114 and S116 are repeated for each additional link. At S118, the web ontology is evaluated for consistency. At S120, the policy 20 is retrieved and used to validate the generated web ontology (S122). The output (S124) of the method may include an overall validation result (e.g., valid or not), the validated web ontology 33, an error report based on the error log 34, or the like, and may be output to storage system 24. The method ends at S126.

Further details of the system and method will now be described.

Types of Resources and Links

To capture the structure of the linked documents fully, the exemplary resource ontology 32 has several types (classes) to classify the resources. At a first level, resources can be classified as XML resources or one or more other type(s) of (non-XML) resource, such as images, word files, and so forth, depending on the application. XML documents in the web ontology are thus classed as an XML resource. XML resources can be further characterized according to a set of XML schemas 18, which can be either well known schemas (e.g., XHTML) or application-specific ones. A resource valid against a specific schema 18 is said to be of that schema's class.

The web ontology 33 enumerates links among resources as well as the resources. Links can be further characterized depending on their type and/or nature. For example, types may be used to distinguish "reference" links from "inclusion" links. As an example, an XHTML page may refer to another page via an XHTML anchor (a reference link) and include an image (an inclusion link), which can be captured by distinguishing a link of type "reference" from a link of type "inclusion." This kind of distinction can be application dependent and can be specified using the tagging mechanism of the dependency generator 44. The nature of the link can be determined from its attributes and/or tags. The ontology engine may capture link types and natures, allowing the ontology rules to be based on these link properties. While link types and link nature are referred to generally as link properties, it is to be appreciated that link nature properties may be modeled as sub-properties of type properties in the ontological engine using a link hierarchy.

Figure 2:
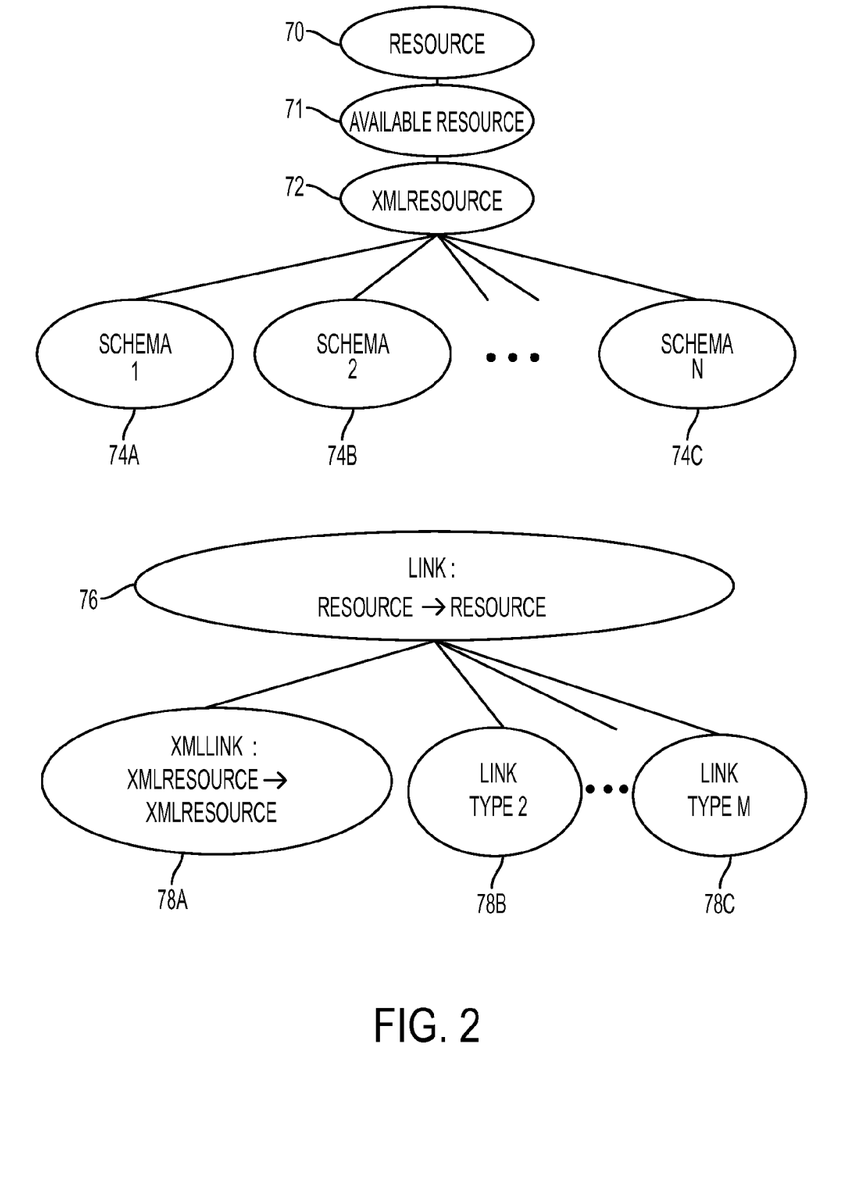
FIG. 2 is an illustrative class hierarchy for use in an ontology.

As illustrated in FIG. 2, the web ontology 33 of resources 14 and links 22 may include:

A class "Resource" 70.

A sub-class "AvailableResource" 71 of the class "Resource" corresponding to resources that can be retrieved. In some cases, resources may not be retrievable because they do not exist, are outside of the domain of resources being processed, or are inside a domain that is not to be processed.

A sub-class "XMLResource" 72 of the class "AvailableResource" 71 (there may be other resource classes, not shown, for non XML resources).

One sub-class 74 of "XMLResource" for each schema 1 . . . N. That is, there is a sub-class 74 corresponding to each schema 18 of FIG. 1. Three schema classes 74A, 74B, and 74C are illustrated by way of example.

One object property 76 called "link" with 'Resource' as its domain and range (the domain being the current resource and the domain being the resource identified by the link).

One sub-property 78 per type of link. In one or more of the types, the domain and range may, for example, be restricted to the class 'XMLResource'. The types 78 may have their particular domain and range further restricted to a particular schema class 74. The domain and range of a particular link type 78 need not be the same (and frequently will not be). Three link types 78A, 78B, and 78C are illustrated by way of example. Link type 78A links only an XML source resource and an XML target resource. Link type 78B may link, for example only an XML source resource of schema 2 and a non-XML target resource, and Link type 78C may link, for example only an XML source resource of schema 1 and an XML target resource, of schema 2, and so forth. Link types may have further properties (sub-types) to capture the natures of the links (not shown).

The names and illustrated types and classes are exemplary and are not intended to be limiting. In particular, the classes 74 corresponding to schemas may be given any suitable unique ID based on their schema name. The class "Resource" may have a property that identifies the underlying resource's URL or other unique identifier. The schema classes 74 may inherit this property. Additional elements may be added, or the structure could be simplified by omitting some subclasses. In summary, the hierarchy illustrated captures that there are resources having links to other resources. Furthermore, some of those resources match the schema types 18 that are part of the resource ontology 32.

Typed Links among Typed Resources Using the Dependency Generator

Not all processed resources 14 need be XML resources, and the system 10 need not be aware of a schema for each XML resource, but there is generally a schema 18 for each XML resource 14 whose links are to be processed. For each schema whose corresponding XML documents are to be processed, there may also be a respective dependency specification 16 (or other link processing method) that specifies how the XML document is processed, with regard to its links. The exemplary dependency specification enables the system 10, for any resource 14 valid against a given schema 18, i) to locate its contained links, ii) optionally, to transform them, iii) to check them, and iv) to type them using the tagging mechanism of the dependency generator, whereby each resulting link can have one or more tags.

Given an input set 21 of URLs pointing to resources 14, the web ontology generation in the method of FIG. 3 may be partially implemented as illustrated in the pseudocode shown in Table 1, using XML schemas 18 and the dependency generator engine 44 to populate the web ontology 33.

TABLE 1

FOR-EACH URL of a resource which is taken out of an input set of URLs:
  IF the resource's URL has not been processed already:
  THEN:
    1. populate the ontology with an individual member of the 'Resource'
      class, .i.e., assert its class as 'Resource'. The individual member
      may be identified by its URL or by some unique identifier
      while its URL becomes recorded using a data property.
    2. Attempt to retrieve the resource (which may include resolving and
      fetching the resource). IF the resource is retrievable, assert its class as
      'AvailableResource'.
    3. IF the AvailableResource is XML-well-formed:
    THEN:
      assert its class as 'XMLResource';
      FOR-EACH of the known schema:
      IF the schema validates the resource:

TABLE 1-continued

THEN:
  A. assert its class in the ontology as the corresponding class (the
    resource thus has the class XML resource and a subclass
    corresponding to the schema)
  B. Use the corresponding dependency generator specification to
    extract any tagged links.
  C. FOR EACH tagged link create an annotated link:
    a. Add its target (its URL) to the set of input resources.
    b. Assert in the ontology the link property between the
      current (source) resource and the resource that is the link
      target;
    c. FOR EACH tag:
      i. Assert in the ontology one link sub-property
        corresponding to the tag (this is one of the nature(s)
        of the link)

Figure 4:
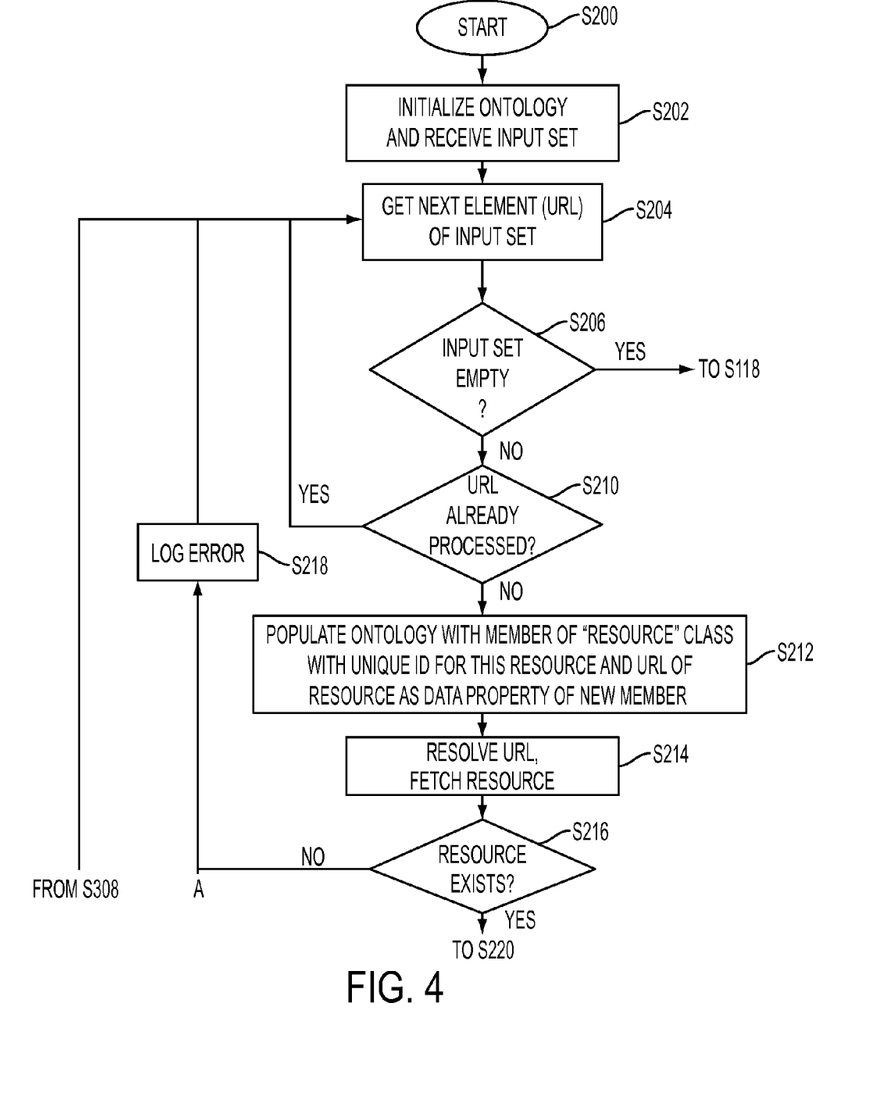
FIG. 4 illustrates a more detailed implementation of the method illustrated in FIG. 3.

With reference also to FIG. 4, a more detailed implementation of the method illustrated in FIG. 3 is shown, which illustrates an embodiment of the algorithm illustrated in TABLE 1.

The method begins at S200.

At S202, corresponding to S102 above, the resource ontology 32 is initialized. This may include receiving and storing the policy ontology 20 in memory. A template in web ontology language which follows the resource hierarchy illustrated in FIG. 2 may be instantiated as the web ontology 32. The set of resource locators 22 is initialized, in memory 30, with the initial set 21, which is received and stored as the set 22 in memory 30.

At S204, the next (which may be the first) resource locator of the set 21 is retrieved by the ontology engine. In the exemplary embodiment, URLs are used to identify resources, though other types of resource locators are contemplated as elements of the input set 21.

At S206, if there is no next element and the input set is empty, indicating that processing of the input set is complete, the resource ontology and input set are output, and the method may proceed to S118 (FIG. 3).

If at S206, there is a next element (URL) in the input set, then, at S210, the ontology engine determines whether the URL has already been processed. This may be determined, for example by querying the web ontology 33 or by other means, such as by querying a database of processed URLs that is built with the ontology. If the URL has already been processed, the method returns to S204 to retrieve the next URL.

Figure 5:
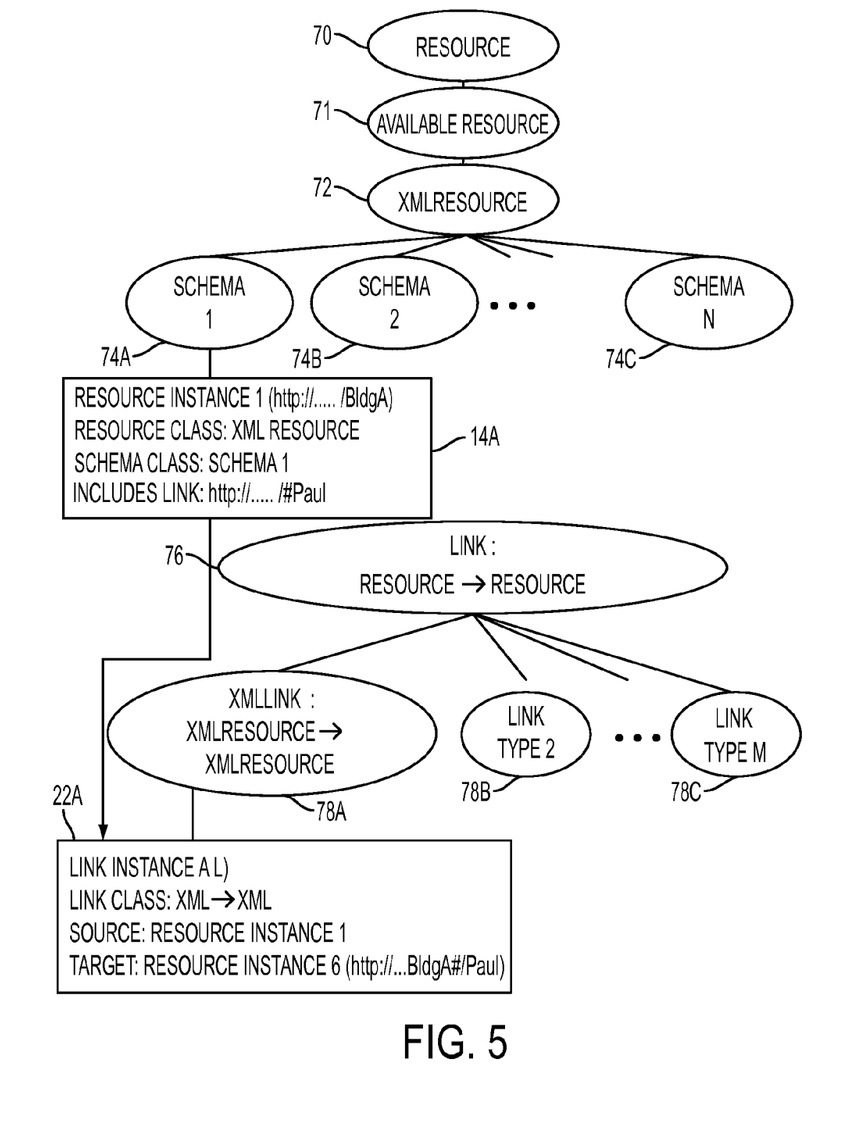
FIG. 5 illustrates a class member and a link added to the hierarchy of FIG. 3.

If the URL has not yet been processed, processing continues at S212, where the resource is added as an instance 14A of the ontology. (See the example in FIG. 5, and S108 above). The ontology is populated with a member of the "resource" class 70 at S212. The "resource" class 70 has a property to store the URL of the resource or a reference to it. Additionally, the class member may be given a unique name to identify it.

At step S214, the ontology engine resolves the resource 14 URL and attempts to fetch it from the resource server 28. Before attempting to fetch the resource, the ontology engine may compare the resource URL to a list of domains. The list of domains may be either a list of domains to be processed or a list of domains not to be processed. If the URL is not inside the list of domains to be processed (or, alternatively, is in the list of domains not to be processed), then the resource is treated as not retrievable. There may be one or more additional classes/subclasses for Resources which are not retrieved/retrievable. One subclass of Resource (a Non-Available Resource class) may be used for URLs for which no attempt was made to fetch them due to their URL domain.

Resources which are in a domain but which are not fetchable (e.g., because they no longer exist) may be asserted as another subclass of Resource 70 (e.g. "ErroneousResource"). In the exemplary method of FIG. 4, for simplicity, resources that can be fetched are treated as "AvailableResources," and other resources are simply classed as "Resource If at S216, the resource does not exist (nothing was retrieved), processing proceeds to step S218. A message is entered in the log 34 at S216 and the next URL is retrieved at S204.

If the resource exists, Processing continues to step S220, where the resource 14 is asserted as a member of class "AvailableResource" and parsed by the XML document parser 40.

At step S222, the parser 40 evaluates whether the resource parsed correctly (i.e., was a valid XML document). If the resource did not parse correctly, processing returns to S216 (via arrow A), where the lack of ability to parse all or a part of the document is recorded as an error, which is logged in the log 34, and then processing continues at S204.

If at S222, the resource parsed correctly (the XML document is well formed), then, at S224, the resource is asserted as a member of class "XMLResource" 72 in the ontology (i.e., class resource, subclass XML resource). The ontology engine then checks all known schemas 18 for a match that validates the resource.

If at step S226, a matching schema that validates the resource has been identified, the method proceeds to S228. If there is no matching schema, then that information is logged at S216, and the next element is processed.

If a schema validates the resource, then at S228 the resource is asserted as a new member of the class corresponding to the schema that validated the resource.

At S230, the ontology engine calls the dependency generator 44. As will be appreciated, the method may process several or all URLs in the set 21, from S204 up to S228, prior to calling the dependency generator.

The dependency generator 44 performs the steps labeled 2.B in Table 1. As the dependency generator processes links, it adds them to the resource ontology 32. Specifically, at S302, the dependency generator receives as input a resource 14, an identified schema 18, and retrieves a corresponding dependency generator specification 16. This assumes a valid schema exists for the resource, previously identified at step S226.

At S304, corresponding to S110, above, the dependency generator 44 applies the appropriate dependency specification 16 and schema 18 to the resource 14 to extract tagged links and creates a links set. This step may be performed according to the method outlined in the U.S. Pat. No. 8,209, 599. For example, the dependency specification may include at least one link description rule and at least one link processing rule for processing links which satisfy the link description rule. Each processing rule may include at least one link transformation rule including an initial link state expressed in a matching language, and a final link state expressed in a matching language. Links in the markup language document are processed in accordance with the link description rule(s) and link processing rule(s) of the specification to extract the links, transform them into a predetermined format, and tag them according to a given type selected from a plurality of types.

The dependency generator then retrieves the first (next) link in the links set, assuming there is one (S306). If at S308, no link was retrieved, the method proceeds to S204 where the next resource is processed.

If at S306, a link was retrieved, then, at S310, the link URL is added to the set of links 22 to be optionally processed in a subsequent loop of the method.

As will be appreciated, the lists of domains to be processed and not processed may be implemented in step S310 instead of step S214.

At S312, a link is asserted in the ontology as a link property 76 with the current resource as it domain value and the target resource as its range value.

At S314, a type (or types) is identified for the link. Specifically, for each tag of the link, a sub-property corresponding to the link tag is asserted in the web ontology.

The method returns to S306 for processing the next link, until all links in the links set have been processed and added to the web ontology.

Once all the links in the set of links 22 have been processed, the method proceeds to S118 (FIG. 3).

Semantic Reasoner Policy Checking

Once the web ontology 33 has been populated with individual members and object properties (e.g., according to the method of FIG. 4 and Table 1), at S118, the semantic reasoner 42 parses the resource ontology 32 to check the soundness of all entailments (completeness). The policy 20 is retrieved (S120) and, the semantic reasoner determines if the policy ontology and web ontology are both internally consistent as well as consistent with each other. If so, the web ontology 33 is validated (S122). For example, if all entailments hold, then the policy 20 is respected. Further logical rules may be added to the resource ontology, in OWL or in SWRL, and the web ontology checked again. If the policy is not respected (i.e., the resource ontology is not valid), the user may be informed so corrective action can be taken. If the policy is not respected, the user may be provided with some explanation of the inconsistency, which may be supplemented by data in the log 34.

The method may be run every time a resource is modified or, alternatively, run incrementally by removing an individual resource and its outgoing properties from the ontology before re-inserting it as described above.

The above method may be modified to allow reasoning about a resource location to be performed. For the policy to cover aspects related to resource location, the ontology may be extended with a notion like network domain (e.g., by adding a property corresponding to whether or not a resource is in the company's own domain, such as www.xyz.com) and a property for different protocols (e.g., a property for https). The method may also be extended with properties regarding resource location (tag links in www.xyz.com) and access protocol.

It is also contemplated that the ontology may permit one-to-many XMLResource-to-Individuals mapping. In the exemplary embodiment, a one-to-one mapping is established between a source resource and a target resource "populated" in the ontology. This limitation can be overcome in various ways. One approach is to annotate the schema to generate several individual members in the ontology, such as one for each of a plurality of target resources. When a resource is parsed according to the annotated schema, it may insert multiple members in the ontology.

The method illustrated in FIGS. 3 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3 and/or 4, can be used to implement the method.

Without intending to limit the scope of the exemplary embodiment, the following example demonstrates the application of the method.

EXAMPLE

Figure 6:
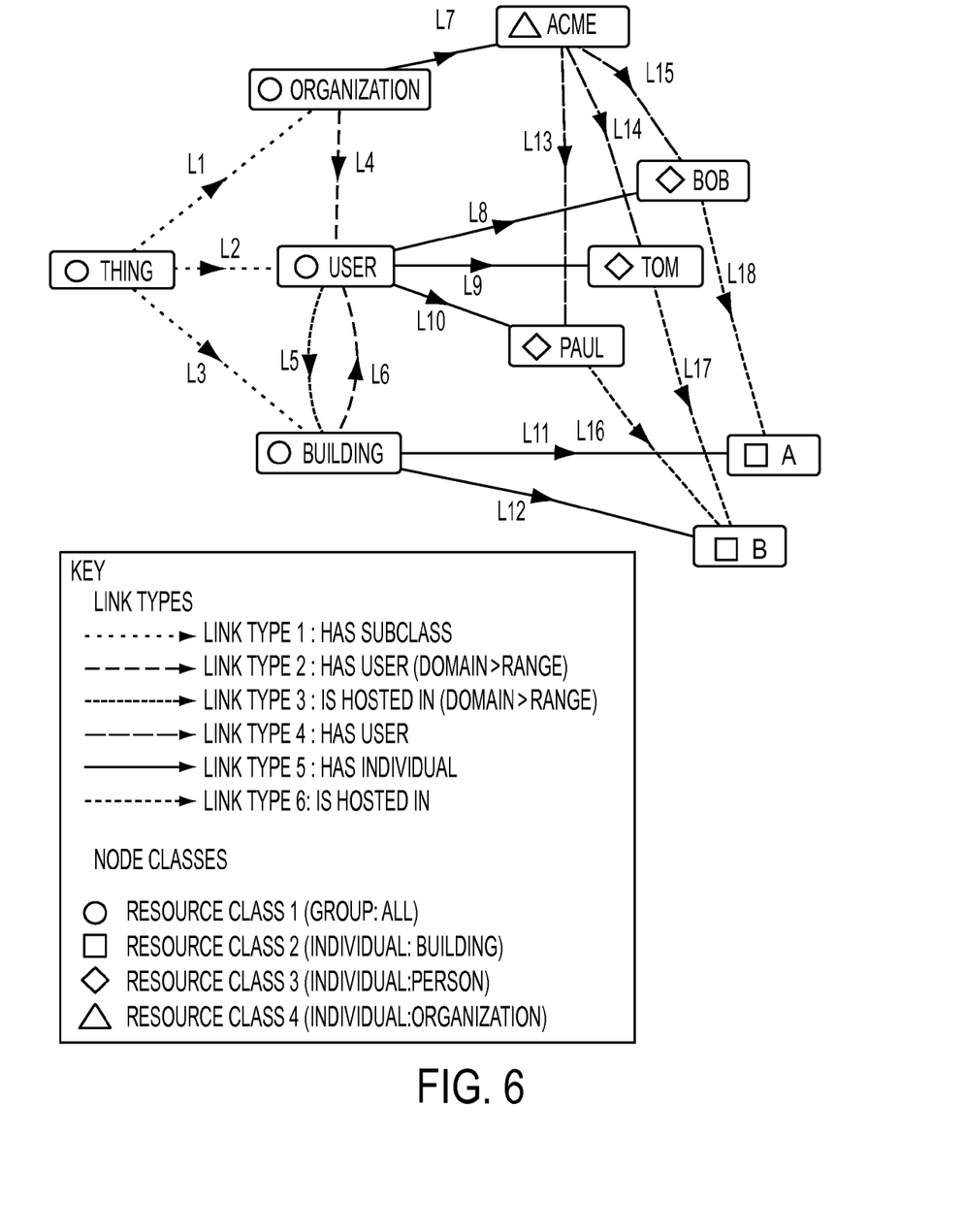
FIG. 6 illustrates an exemplary network of linked resources.

Assume that the ACME company wishes to create a web ontology for a set of documents related to the buildings and people in one of the company's locations. The company structure for this site may be as shown in FIG. 6, where there are a set of buildings and people. The company may have a website with various documents accessible on the website, each with its own unique reference. For example, each of the buildings on the site may have an XML document with a link such as http://ACMEHQ/2012/06/UserBuilding#.

A resource ontology may be initialized by defining a set of schemas, one for each of various types of its XML documents, such as a building directory class, a building individual document class, and so forth, or simply different schemas for groups and individuals. The documents on the website may include internal links to other documents, which the company may wish to label in the ontology with properties such as "has user", "is hosted in", and so forth, depending on the classes of the source and target documents. The company may define a policy based on its requirements for the web ontology, such as documents of class individual person cannot have a link to a document of class individual person, or no resource of class building can have more than 10 links to documents of class individual person.

The web ontology is initialized with an initial set of the company's links and the system retrieves the corresponding documents and processes them using the method described above. Each retrieved document is assigned a class, such as XML Resource, and a subclass depending on which of the schemas it matches, and added to the web ontology as an instance. The web ontology begins to grow from these few instances. The links to other documents are extracted, for example, with the dependency generator, and any links which do not refer to the company's website http://ACMEHQ/2012/ . . . are ignored. The remaining links are processed to generate links in the ontology and are used to retrieve their corresponding documents, which are similarly processed in the next iteration. TABLE 2 illustrates the type of ontology which may be created using OWL.

TABLE 2

```
<?xml version="1.0" ?>
<!DOCTYPE rdf:RDF >
```

TABLE 2-continued

```
<rdf:RDF xmlns="http://ACMEHQ/2012/06/Bldg#"
    xml:base="http://ACMEHQ/2012/06/Bldg"
    xmlns:rdfs="http://www.w3.org/2000/01/rdf-schema#"
    xmlns:owl="http://www.w3.org/2002/07/owl#"
    xmlns:xsd="http://www.w3.org/2001/XMLSchema#"
    xmlns:rdf="http://www.w3.org/1999/02/22-rdf-syntax-ns#">
<owl:Ontology rdf:about="http://ACMEHQ/2012/06/Bldg"/>
<!--Object properties -->
<!-- http://ACMEHQ/2012/06/Bldg#hasUser -->
<owl:ObjectProperty rdf:about=
"http://ACMEHQ/2012/06/Bldg#hasUser">
    <rdfs:domain rdf:resource="http://ACMEHQ/2012/06/Bldg#Org" />
    <rdfs:range rdf:resource="http://ACMEHQ/2012/06/Bldg#User" />
</owl:ObjectProperty>- <!--http://ACMEHQ/2012/06/Bldg#host -->
<owl:ObjectProperty rdf:about="http://ACMEHQ/2012/06/Bldg#hosts"
/>
<!-- http://ACMEHQ/2012/06/Bldg#isHostedIn -->
<owl:ObjectProperty
rdf:about="http://ACMEHQ/2012/06/Bldg#isHostedIn">
    <rdf:type
rdf:resource="http://www.w3.org/2002/07/owl#FunctionalProperty" />
    <rdfs:range rdf:resource="http://ACMEHQ/2012/06/Bldg#Building" />
    <rdfs:domain rdf:resource="http://ACMEHQ/2012/06/Bldg#User" />
    <owl:inverseOf rdf:resource="http://ACMEHQ/2012/06/Bldg#hosts" />
</owl:ObjectProperty>- <!-- classes -->
<!-- http://ACMEHQ/2012/06/Bldg#Building -->
<owl:Class rdf:about="http://ACMEHQ/2012/06/Bldg#Building">
    <rdfs:subClassOf>
        <owl:Restriction>
            <owl:onProperty rdf:resource="http:/ACMEHQ/2012/06/
Bldg#hosts"
/>
            <owl:onClass rdf:resource="http://ACMEHQ/2012/06/Bldg#User"
/>
            <owl:maxQualifiedCardinality
rdf:datatype="http://www.w3.org/2001/XMLSchema#nonNegativeInteger"
>2</o
wl:maxQualifiedCardinality>
        </owl:Restriction>
    </rdfs:subClassOf>
</owl:Class>
<!-- http://ACMEHQ/2012/06/Bldg#Organization -->   <owl:Class
rdf:about="http://ACMEHQ/2012/06/Bldg#Organization" />
<!-- http://ACMEHQ/2012/06/Bldg#User -->
<owl:Class rdf:about="http://ACMEHQ/2012/06/Bldg#User" />
<!-(Individuals) -->
<!-- http://ACMEHQ/2012/06/Bldg#A -->
<Building rdf:about="http://ACMEHQ/2012/06/Bldg#A">
    <rdf:type
rdf:resource="http://www.w3.org/2002/07/owl#NamedIndividual" />
</Building>
<!-- http://ACMEHQ/2012/06/Bldg#ACME -->
C:\NRPortbl\IMANMAIN\ASKERRY\5074441.XML <organization
rdf:about="http://ACMEHQ/2012/06/Bldg#ACME">
    <rdf:type
rdf:resource="http://www.w3.org/2002/07/owl#NamedIndividual" />
        <hasUser rdf:resource="http://ACMEHQ/2012/06/Bldg#Bob" />
        <hasUser rdf:resource="http://ACMEHQ/2012/06/Bldg#Paul" />
        <hasUser rdf:resource="http://ACMEHQ/2012/06/Bldg#Tom" />
</Organization>
<!--http://ACMEHQ/2012/06/Bldg#B-->
C:\NRPortbl\IMANMAIN\ASKERRY\5074441.XML <Building
rdf:about="http://ACMEHQ/2012/06/Bldg#B">
    <rdf:type
rdf:resource="http://www.w3.org/2002/07/owl#NamedIndividual" />
</Building>
<!-- http://ACMEHQ/2012/06/Bldg#Bob -->
<User rdf:about="http://ACMEHQ/2012/06/Bldg#Bob">
    <rdf:type
rdf:resource="http://www.w3.org/2002/07/owl#NamedIndividual" />
    <isHostedIn rdf:resource="http://ACMEHQ/2012/06/Bldg#A" />
</User>
<!-- http://ACMEHQ/2012/06/Bldg#Paul -->
C:\NRPortbl\IMANMAIN\ASKERRY\5074441.XML <User
rdf:about="http://ACMEHQ/2012/06/Bldg#Paul">
    <rdf:type
rdf:resource="http://www.w3.org/2002/07/owl#NamedIndividual" />
    <isHostedIn rdf:resource="http://ACMEHQ/2012/06/Bldg#B" />
</User>
<!-- http://ACMEHQ/2012/06/Bldg#Tom -->
```

TABLE 2-continued

```
C:\NRPortbl\IMANMAIN\ASKERRY\5074441.XML <User
rdf:about="http://ACMEHQ/2012/06/Bldg#Tom" >
    <rdf:type
rdf:resource="http://www.w3.org/2002/07/owl#NamedIndividual" />
        <isHostedIn rdf:resource="http://ACMEHQ/2012/06/Bldg#B" />
    </User>
    <!--(General axioms) -->
C:\NRPortbl\IMANMAIN\ASKERRY\5074441.XML <rdf : Description>
    <rdf:type
rdf:resource="http://www.w3.org/2002/07/owl#AllDifferent" />
C:\NRPortbl\IMANMAIN\ASKERRY\5074441.XML
<owl : distinctMembers
rdf:parseType="Collection">
        <rdf:Description rdf:about="http://ACMEHQ/2012/06/Bldg#A" />
        <rdf:Description rdf:about="http://ACMEHQ/2012/06/Bldg#
            ACME" />
        <rdf:Description rdf:about="http://ACMEHQ/2012/06/Bldg#B" />
        <rdf:Description rdf:about="http://ACMEHQ/2012/06/Bldg#Bob" />
        <rdf:Description rdf:about="http://ACMEHQ/2012/06/Bldg#Paul" />
        <rdf:Description rdf:about="http://ACMEHQ/2012/06/Bldg#Tom"
/>
    </owl:distinctMembers>
    </rdf:Description>
</rdf:RDF>
```

In a more human readable form, this can be represented as shown in Table 3:

TABLE 3

```
@prefix xsd: <http://www.w3.org/2001/XMLSchema#> .
@prefix owl: <http://www.w3.org/2002/07/owl#> .
@prefix UserBuilding: <http:// ACMEHQ//2012/06/UserBuilding#> .
@prefix : <http://ACMEHQ/2012/06/UserBuilding#> .
@prefix xml: <http://www.w3.org/XML/1998/namespace> .
@prefix rdf: <http://www.w3.org/1999/02/22-rdf-syntax-ns#> .
@prefix rdfs: <http://www.w3.org/2000/01/rdf-schema#> .
@base <http:// ACMEHQ//2012/06/UserBuilding> .
<http://ACMEHQ/2012/06/UserBuilding> rdf:type owl:Ontology .
# Object Properties
http://ACMEHQ/2012/06/UserBuilding#hasUser
UserBuilding:hasUser       rdf:type owl:ObjectProperty ;
                           rdfs:domain UserBuilding:Organization ;
                           rdfs:range UserBuilding:User .
http:// ACMEHQ//2012/06/UserBuilding#hosts
UserBuilding:hosts rdf:type owl:ObjectProperty.
###http://ACMEHQ//2012/06/UserBuilding#isHostedIn
UserBuilding:isHostedIn    rdf:type owl: FunctionalProperty ,
                           owl:ObjectProperty ;
                           rdfs:range UserBuilding:Building ;
                           rdfs:domain UserBuilding:User ;
                  owl:inverseOf UserBuilding:hosts .
# Classes
http://ACMEHQ/2012/06/UserBuilding#Building
UserBuilding:Building    rdf:type owl:Class ;
                 rdfs:subClassOf [ rdf:type owl:Restriction ;
                                   owl:onProperty
                                     UserBuilding:hosts;
                                   owl:onClass UserBuilding:
                                     User;
                                   owl: maxQualifiedCardinal-
ity
                                    "2"^^xsd:nonNegative
                                      Integer].
http://ACMEHQ/2012/06/UserBuilding#Organization
UserBuilding:Organization        rdf:type owl:Class .
http://ACMEHQ/2012/06/UserBuilding#User
UserBuilding: User rdf:type owl:Class .
# Individuals
http:// ACMEHQ /2012/06/UserBuilding#A
UserBuilding:A    rdf:type owl:NamedIndividual ,
                     UserBuilding:Building .
http:// ACMEHQ /2012/06/UserBuilding#ACME
UserBuilding:ACME    rdf:type owl:NamedIndividual ,
                     UserBuilding:Organization ;
                 UserBuilding:hasUser     UserBuilding:Bob ,
                                          UserBuilding:Paul ,
                                          UserBuilding:Tom .
http://ACMEHQ/2012/06/UserBuilding#B
UserBuilding:B    rdf:type owl:NamedIndividual ,
                     UserBuilding:Building .
http://ACMEHQ/2012/06/UserBuilding#Bob
UserBuilding:Bob    rdf:type owl:NamedIndividual ,
                     UserBuilding:User ;
                       UserBuilding:isHostedIn UserBuilding:A .
http://ACMEHQ/2012/06/UserBuilding#Paul
UserBuilding:Paul rdf:type owl: NamedIndividual ,
                     UserBuilding:User ;
                       UserBuilding:isHostedIn UserBuilding:B .
###http://ACMEHQ/2012/06/UserBuilding#Tom
UserBuilding:Tom    rdf:type owl: Named Individual ,
                     UserBuilding:User ;
                       UserBuilding:isHostedIn UserBuilding:B .
# General axioms
[ rdf:type owl:AllDifferent ;
owl:distinctMembers       ( UserBuilding:A
                            UserBuilding:ACME
                            UserBuilding:B
                            UserBuilding:Bob
                            UserBuilding:Paul
                            UserBuilding:Tom
                          )
] .
```

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating an ontology of linked resources comprising:

providing a policy comprising at least one logical rule which is to hold across an ontology of linked resources;

initializing a set of resources with an initial subset of source resources of the set of resources, each source resource in the initial subset being identified by a respective link;

with a computer processor, processing each of the source resources in the subset, comprising:

populating the ontology with a corresponding member of a resource class, determining whether the source resource is valid against a schema by comparing the source resource to a plurality of schemas to identify a matching schema, each schema of the plurality of schemas having a corresponding dependency specification;

for a source resource that is valid against a schema in the plurality of schemas, asserting the member's class as a class specific to the schema of the validated source resource in the ontology, and applying the corresponding dependency specification of the matching schema to the source resource to extract links within the source resource, each extracted link identifying a target resource of the set of resources, providing for asserting a link property in the ontology for a link between the source resource and the target resource identified by the link extracted from the source resource; and providing for populating the ontology with a member of the resource class for the identified target resource; and verifying that the at least one logical rule holds across the set of resources in the ontology.

2. The method of claim 1, further comprising outputting the ontology.

3. The method of claim 1, wherein the extracting links within the resource comprises parsing the validated resource according to a dependency specification corresponding to the matching schema.

4. The method of claim 1, further comprising generating a log comprising errors accumulated during processing of the resources.

5. The method of claim 1, wherein the ontology is generated using a Web Ontology Language (OWL).

6. The method of claim 1, wherein the links comprise Uniform Resource Locators (URLs).

7. The method of claim 1, wherein the validated source resource is an Extensible Markup Language (XML) document.

8. The method of claim 1, wherein the ontology has a class for resources.

9. The method of claim 8, wherein each schema of the plurality of schemas has a corresponding class in the ontology which is a subclass of the resource class.

10. The method of claim 1, wherein the providing for extracting links within the source resource comprises providing for identifying a tag for an extracted link and wherein the asserting of the link property comprises asserting a property for the link corresponding to the extracted link.

11. The method of claim 1, wherein the link property relates to at least one of:
a type of the link selected from a plurality of link types, and
a class of at least one of the source resource and the target resource.

12. A method for generating an ontology of linked resources comprising:
providing a policy comprising at least one logical rule which is to hold across an ontology of linked resources;
initializing a set of resources with an initial subset of source resources of the set of resources, each source resource in the initial subset being identified by a respective link;
with a computer processor, processing each of the source resources in the subset, comprising:
populating the ontology with a corresponding member of a resource class,
for a source resource that is valid against a schema, asserting the member's class as a class specific to the schema of the validated source resource in the ontology,
for a source resource that is valid against a schema, providing a dependency specification for extracting links within the source resource, each extracted link identifying a target resource of the set of resources,
providing for asserting a link property in the ontology for a link between the source resource and the target resource identified by the link extracted from the source resource, including:
asserting a first property which defines a type of the link, the type of link being selected from a plurality of link types, the plurality of types including a type which specifies that both resources are XML resources, and
asserting a second property which defines a sub-type of the link, the sub-type of link being selected from a plurality of link sub-types, the plurality of link sub-types including a sub-type which identifies a location of the target resource;
providing for populating the ontology with a member of the resource class for the identified target resource; and
verifying that the at least one logical rule holds across the set of resources in the ontology.

13. The method of claim 1, wherein the initializing of the initial subset of resources comprises receiving a list of links and retrieving the source resources based on the list.

14. The method of claim 1, wherein the ontology includes a plurality of resource classes.

15. The method of claim 14, wherein one of the resource classes includes XML documents as its members and another of the resource classes excludes XML documents as its members.

16. The method of claim 1, further comprising, for each identified target resource added to the ontology as a member:
considering the target resource as a new source resource and determining whether the new source resource is valid against a schema from the plurality of schemas and for a new source resource that is valid against the schema,
asserting a member of a class specific to the schema of the validated new source resource in the ontology; and
providing a dependency specification for extracting links within the new source resource, each extracted link identifying a target one of the set of resources; and
providing for asserting a link property in the ontology for a link between the new source resource and the target resource identified by the extracted link.

17. A computer program product comprising a non-transitory computer-readable recording medium on which a control program is recorded which, when executed by a computer, performs the method of claim 1.

18. A system comprising memory which stores instructions for generating an ontology of linked resources and a processor for executing the instructions, the instructions comprising:
providing a policy comprising at least one logical rule which is to hold across an ontology of linked resources;
initializing a set of resources with an initial subset of source resources of the set of resources, each source resource in the initial subset being identified by a respective link;
with a computer processor, processing each of the source resources in the subset, comprising:
populating the ontology with a corresponding member of a resource class,
determining whether the source resource is valid against a schema by comparing the source resource to a plurality of schemas to identify a matching schema, each schema of the plurality of schemas having a corresponding dependency specification;
for a source resource that is valid against a schema in the plurality of schemas,
asserting the member's class as a class specific to the schema of the validated source resource in the ontology, and
applying the corresponding dependency specification of the matching schema to the source resource to extract links within the source resource, each extracted link identifying a target resource of the set of resources,
providing for asserting a link property in the ontology for a link between the source resource and the target resource identified by the link extracted from the source resource; and
providing for populating the ontology with a member of the resource class for the identified target resource; and
verifying that the at least one logical rule holds across the set of resources in the ontology.

19. A computer-based system for building an ontology representing linked documents comprising:
  memory which stores:
    a policy that specifies at least one property of an ontology of linked resources;
    an ontology engine which for an initial subset of source resources from a set of resources, each source resource being accessible by a link, adds a class member to an ontology for each source resource in the subset;
    a dependency generator which processes the subset of source resources to extract links that are compliant with a dependency specification of a corresponding matching schema of a plurality of schemas, the ontology engine adding a link property to the ontology for a link between the source resource containing an extracted link and a target resource in the set of resources identified by the extracted link, the ontology engine being configured for adding a class member to the ontology for the target resource, the dependency generator configured for processing the target resource as a source resource;
    a semantic reasoner which verifies that the ontology is consistent with the policy; and
  a processor in communication with the memory configured for implementing the ontology engine, dependency generator, and semantic reasoner.

20. The system of claim 19, wherein the ontology engine retrieves the initial subset of resources based on a list of URLs.

21. The system of claim 19, wherein the set of resources comprises at least one XML document.

22. The system of claim 19, wherein the ontology is stored in the memory using a Web Ontology Language (OWL).

23. A method for generating an ontology of linked resources comprising:
  defining a plurality of resource classes for a web ontology, the resource classes including a plurality of XML resource classes;
  providing a schema for each of the plurality of XML resource classes and a respective dependency specification for extracting links from a resource which is valid against one of the schemas;
  initializing a set of resources with an initial subset of the set of resources, each resource in the initial subset being identified by a respective link;
  with a computer processor, processing each resource, comprising:
    a) adding a class member to an ontology for each resource currently in the set of resources,
    b) determining whether the source resource is valid against one of the schemas by comparing the source resource to the schemas to identify a matching one of the schemas, and for each resource which matches one of the schemas, asserting its class in the ontology as the class specific to the schema of the validated resource,
    c) for a resource that is valid against one of the schemas, extracting links within the resource with the respective dependency specification, each extracted link identifying one of the set of resources, and
    d) asserting a link property in the ontology for a link between the resource in the initial subset and the resource identified by an extracted link; and
  repeating a), b), c), and d) for each of a plurality of the identified resources added to the set of resources to generate the ontology.

24. The method of claim 23, further comprising verifying that the generated ontology is compliant with a policy.

* * * * *